US006745151B2

(12) United States Patent
Marko et al.

(10) Patent No.: US 6,745,151 B2
(45) Date of Patent: Jun. 1, 2004

(54) REMOTE DIAGNOSTICS AND PROGNOSTICS METHODS FOR COMPLEX SYSTEMS

(75) Inventors: Kenneth A. Marko, Ann Arbor, MI (US); Doug Thornburg, Dearborn, MI (US); George Halow, Farmington Hills, MI (US); Shane Rachedi, Bloomfield Hills, MI (US)

(73) Assignee: Ford Global Technologies, LLC, Deaborn, MI (US)

(*) Notice: Subject to any disclaimer, the term of this patent is extended or adjusted under 35 U.S.C. 154(b) by 96 days.

(21) Appl. No.: 10/063,828

(22) Filed: May 16, 2002

(65) Prior Publication Data

US 2003/0216889 A1 Nov. 20, 2003

(51) Int. Cl.[7] .......... G06F 11/30
(52) U.S. Cl. .......... 702/182; 701/35
(58) Field of Search .......... 702/58, 61, 66–68, 702/71, 80–83, 93, 104, 113, 119, 180, 182–184, 193, 199, 120–123; 701/24, 25, 29, 30, 33

(56) References Cited

U.S. PATENT DOCUMENTS

| | | | | | |
|---|---|---|---|---|---|
| 4,258,421 | A | * | 3/1981 | Juhasz et al. | 701/35 |
| 4,728,922 | A | | 3/1988 | Christen et al. | 340/991 |
| 4,804,937 | A | | 2/1989 | Barbiaux et al. | 340/459 |
| 5,442,533 | A | | 8/1995 | Kaplan | 362/303 |
| 5,445,347 | A | * | 8/1995 | Ng | 246/169 R |
| 5,615,930 | A | * | 4/1997 | McGrath et al. | 303/7 |
| 5,630,048 | A | * | 5/1997 | La Joie et al. | 714/25 |
| 5,638,273 | A | * | 6/1997 | Coiner et al. | 701/35 |
| 5,661,651 | A | | 8/1997 | Geschke et al. | 701/88 |
| 5,758,300 | A | | 5/1998 | Abe | 455/424 |
| 5,884,202 | A | * | 3/1999 | Arjomand | 701/29 |
| 5,926,819 | A | * | 7/1999 | Doo et al. | 707/104.1 |
| 5,941,918 | A | * | 8/1999 | Blosser | 701/29 |
| 5,967,115 | A | * | 10/1999 | Konopka et al. | 123/322 |
| 6,055,468 | A | * | 4/2000 | Kaman et al. | 701/29 |
| 6,084,870 | A | | 7/2000 | Wooten et al. | 370/349 |
| 6,107,917 | A | | 8/2000 | Carrender et al. | 340/505 |
| 6,169,943 | B1 | | 1/2001 | Simon et al. | 701/29 |
| 6,181,992 | B1 | | 1/2001 | Gurne et al. | 701/29 |
| 6,181,994 | B1 | | 1/2001 | Colson et al. | 701/33 |
| 6,295,492 | B1 | | 9/2001 | Lang et al. | 701/33 |
| 6,381,532 | B1 | * | 4/2002 | Bastian et al. | 701/114 |
| 6,609,051 | B2 | * | 8/2003 | Fiechter et al. | 701/33 |

* cited by examiner

*Primary Examiner*—Marc S. Hoff
*Assistant Examiner*—Mohamed Charioui

(57) ABSTRACT

A diagnostic/prognostic system monitors performance of a vehicle or other apparatus wherein the vehicle has a plurality of operational components. Each operational component has a predetermined nominal operating state and generates respective electrical signals pursuant to its operation. A data collection memory in the vehicle stores samples of the electrical signals in a rolling buffer. An analyzer in the vehicle is responsive to the electrical signals for detecting a trigger event indicative of at least a potential variance of an operational component from its nominal operating state. A computation center located remotely from the vehicle has a database storing representations of electrical signals for classifying nominal and irregular operating states of the operational components. A transmitter is activated by the trigger event to transmit at least some of the stored samples in the rolling buffer at the time of the trigger event to the computation center. The computation center receives the transmitted samples and classifies them according to the nominal or irregular operating states.

24 Claims, 6 Drawing Sheets

REMOTE DIAGNOSTICS AND PROGNOSTICS METHODS FOR COMPLEX SYSTEMS

BACKGROUND OF INVENTION

The present invention relates in general to remote diagnostics and prognostics for complex systems, such as vehicles or other machinery, and, more specifically, to a vehicle telematics system and method for transmitting operating data collected on-board a vehicle to a central diagnostic center.

Complex mechanical, electrical, and electromechanical systems including automobiles, machinery, electronic control systems, and other devices are mass-produced and in widespread use. Even though manufacturers generally make continuous improvements in reliability and durability of such systems, tendencies toward failures or degraded system performance over time cannot be totally eliminated. Therefore, system monitoring and diagnostic testing is often used to detect anomalies and their causes.

Diagnostic/monitoring functions have been deployed both on-board the systems and at special testing centers. In automobile systems, for example, a combination of on-board diagnostics and service bay diagnostics is utilized to identify a problem and to isolate its cause in order to guide repair procedures in an economical fashion. Onboard diagnostic systems, however, are limited in scope and capability by cost and hardware constraints in a vehicle environment. Diagnostics at a service bay, on the other hand, are less constrained by cost or packaging space but they require that a vehicle be brought to a service bay facility before either a fault can be identified or corrective actions (e.g., obtaining replacement parts) can be initiated.

The use of remote monitoring and diagnostics and/or recording of data signals have been investigated for improving this situation, but without fully satisfactory results. Due to bandwidth limitations of remote communications channels (e.g., cellular or other RF systems), only relatively small amounts of actual data can be exported from the vehicle during normal operation. Even as greater bandwidth becomes available, it would still not be practical to merely export large volumes of data for remote analysis, especially where a large customer base (e.g., fleet of vehicles) is involved.

In-vehicle recording of data for later access at a service bay can utilize greater amounts of data if a sufficiently large recording capacity is provided. However, use of such data requires visits to a service facility and is generally useful only after degraded performance is already present.

SUMMARY OF INVENTION

The present invention achieves significant advantages in quick and efficient detection and prediction of failure or non-optimal performance of complex systems together with improvements in delivering corrective actions to restore optimal performance.

In one aspect of the invention, a system is provided for monitoring performance of an apparatus wherein the apparatus has a plurality of operational components, each operational component having a predetermined nominal operating state. Each operational component generates respective electrical signals pursuant to its operation. A data collection memory in the apparatus stores samples of the electrical signals in a rolling buffer. An analyzer in the apparatus is responsive to the electrical signals for detecting a trigger event indicative of at least a potential variance of an operational component from its nominal operating state. A computation center located remotely from the apparatus has a database storing representations of electrical signals for classifying nominal and irregular operating states of the operational components. A transmitter is activated by the trigger event to transmit at least some of the stored samples in the rolling buffer at the time of the trigger event to the computation center. The computation center receives the transmitted samples and classifies them according to the nominal or irregular operating states.

DETAILED DESCRIPTION

Figure 1:
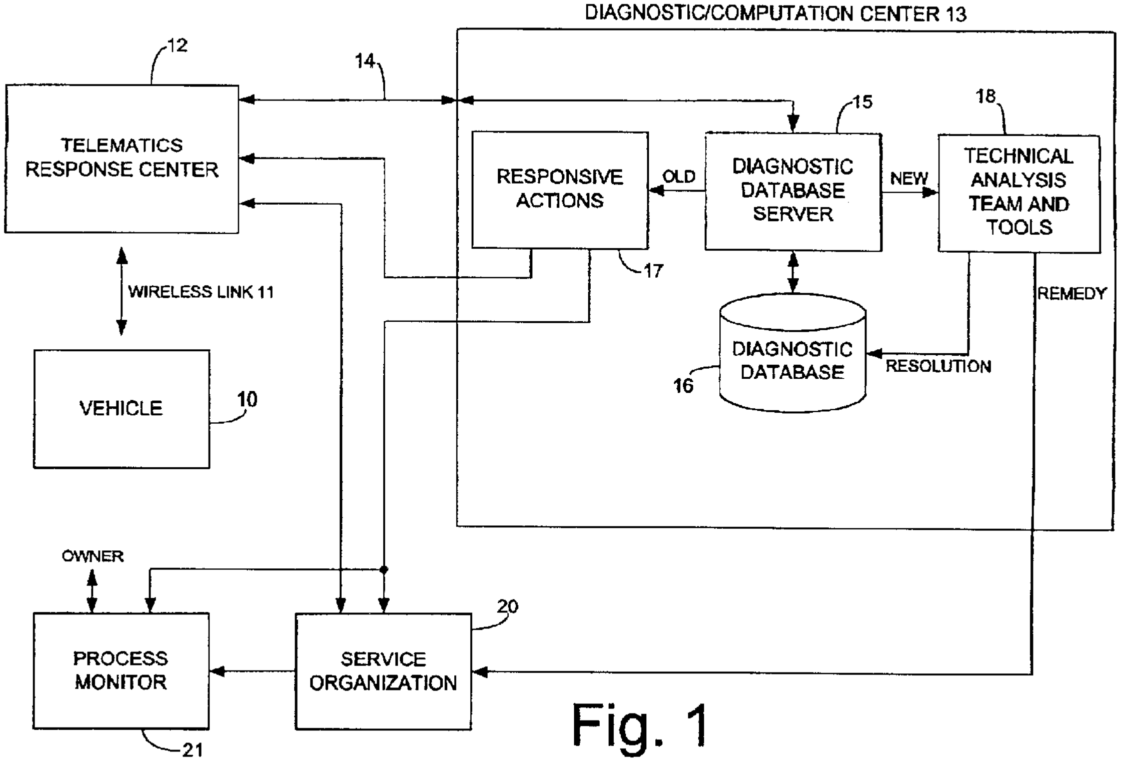
FIG. 1 is a block diagram of a diagnostics and prognostics service delivery system for maintaining a vehicle.

The present invention employs a performance monitoring system utilizing a combination of on-board data collection, modest on-board computational capabilities (i.e., moderate memory and processing), a comprehensive computation center (e.g., data classification and decision server), and moderate bandwidth two-way communications between the vehicle and the computation center. In one preferred embodiment, an on-board high-speed data link connects a diagnostic module in the vehicle to various operational components (e.g., electronic modules, multiplex communication buses, sensors, and actuators) that generate electrical signals pursuant to their operation. The high speed data link can be controlled from the diagnostic unit to select the identity of the samples collected. The collected data preferably includes diagnostic trouble codes (DTC's), internal flags indicative of various system states (e.g., a flag to indicate that a fault was noted on a previous trip), input and output variables for the various control microcontrollers, and contents of microcontroller memory. The collected and recorded samples may also include data from signal processing performed by the diagnostic module itself. On-board processing capability preferably includes simple numerical analysis and other capabilities, especially for performing long-term diagnostic analysis (such as histograms, parameter averaging, etc.).

In one preferred embodiment, a rolling buffer records the time-series sample values of a number of predetermined parameters (e.g., about 20 parameters) in order to maintain the last ~20 seconds of data in the buffer. Upon receipt of a triggering event, an additional 20 seconds of data is recorded and held. The triggering event is used to automatically initiate transmission of data to the computation/decision center. Thus, the rolling buffer captures information both prior to and after the trigger event in order to provide information on system operation immediately prior to fault detection and immediately after it.

The collected data is a subset of all the electrical signals available within a vehicle. A preferred embodiment employs dynamic reconfigurability of the data collection and on-board analysis processors based upon off-board analysis (i.e., in the central computation center) which determines the suitability and the completeness of the collected information for any particular diagnostic process. Specifically, when the default data set is not adequate for diagnostic analysis in view of a particular trigger event that has occurred, the information gathered can be modified to a more suitable set, either upon demand from the external decision center or upon control from the on-board diagnostic module itself. In other words, the diagnostic module selects data to be recorded contingent upon the fault codes that are set or trigger event that has occurred.

The transmission of data to the computation/decision center can be initiated by a variety of trigger events including 1) on-board DTC's, pending codes, or other indications in the collected data of a potential variance of an operational component from its nominal operating state, 2) a timed data transfer (i.e., to transmit data or perform certain analyses at regular intervals), 3) operator initiated button presses (for events noticed by a driver but that are not detected by existing on-board diagnostics), 4) remote queries allowing vehicle data to be gathered for diagnostic and customer needs (vehicle location, vehicle condition etc), 5) satisfaction of embedded and modifiable logical expressions which scan incoming data for particular operating modes or conditions of interest.

The diagnostic/prognostic system is capable of executing small programs to detect the potential variances and generate trigger events. The scripted programs can be downloaded and can be tailored to various custom features and diagnostic needs which may not have been anticipated at the time a particular vehicle was produced.

The invention provides data surrounding the occurrence of any triggering event in a manner that can be tailored to meet certain diagnostic needs. For example, the frequency of data sampling can be adjusted (from highest possible speed communication port speed to any slower rate) to capture the appropriate time window of information surrounding a trigger event.

The system can be programmed to change the types, frequencies and identities of the parameters recorded in response to any triggering event or remote command. Such parameters can be constructed from logical or numerical operations on the normally monitored data, for example.

The invention is also designed to trigger on events such as internal flag settings (based upon system states) which are found to be precursors of failure modes. It is thus possible to provide a time-to-failure estimate for specified failure modes, especially in response to the comprehensive analysis performed in the computation/decision center.

The invention uses an external, centralized computational resource to analyze the data and render a diagnosis, whether by automated analysis or expert technician. The analysis can be completed using real-time data exchange with the vehicle and executing diagnostic routines as necessary to accomplish the diagnostic task. The system logs and archives all data transmitted to the central server, such as time, location, and vehicle identification numbers (VIN) along with the data captured.

The diagnostic module can be designed to permit remote programming of the microcontroller to implement repair processes (e.g., reprogramming of operating parameters of vehicle controllers) which ordinarily would require the vehicle to be brought to a service center.

The overall system preferably includes security protection to prevent unauthorized interaction with a vehicle. The security protection may have several layers of authority for personal privacy protection and access restrictions for multiple users (e.g., dealer, manufacturer, personal, family, etc.).

An on-board communication device is provided to present information to the vehicle operator. The device may be simply a radio text display, a display screen, or voice messages transmitted by speakers in the vehicle, for example.

Additionally, vehicle data can be linked to information gathered from vehicle operators through a cell phone or local area network or website input. This information is intended to augment the diagnostic evaluation by providing an opportunity to record observations of symptoms or other circumstances associated with a particular triggering event, but especially for operator initiated data capture which has no associated DTC.

Specific details of the present invention in connection with an embodiment directed to monitoring motor vehicles in a large, mobile fleet will be disclosed with reference to FIGS. 1–6.

FIG. 1 shows a vehicle 10 connected to a telematics response center 12 via a communication channel including a wireless link 11. Link 11 and response center 12 may include a cellular telephone-based telematics service system for connecting a vehicle to various electronic and communication services, as is commercially available through various cellular service providers, for example. However, the system may also function using batch transmission of data through a wireless link to local area networks (LAN's) which receive data at much higher bandwidths when the vehicle is in proximity to designated receivers (e.g., deployed at service stations or along the roadside).

A diagnostic computation and decision center 13 can be co-located with response center 12 or can be remotely located, such as at facilities of the vehicle manufacturer. A digital network connection 14 interconnects response center 12 and computation center 13, such as a public Internet connection or a private network media. Data messages sent from vehicle 10 to response center 12 are relayed over network 14 to a diagnostic database server 15 in computation center 13. Server 15 initiates an attempt to classify the data in the received message according to known potential irregularities for the subject vehicle. The classification is first attempted by comparing with an existing diagnostic database 16 which the manufacturer has compiled based on known performance parameters of the vehicle and its operational components (e.g., powertrain or other control modules, actuators, sensors, etc.). The comparison may be based on pattern recognition or other analysis to identify "hits" or matches between the incoming vehicle data and data patterns stored in database 16, each hit being representative of component failures or potential failures apparent in the data. Typically, the data from the vehicle is reduced in complexity prior to pattern matching by an operation known as feature extraction. In this operation, complex time series signals are analyzed to extract "features" which are useful for diagnostic purposes. These include, but are not limited to, parameters such as the mean signal value, its variance, its maximum value, minimum value, number of zero crossing per unit time, weighted moving average value etc. The set of "features" extracted is determined from an analysis of the efficacy of each feature for diagnostic purposes, and when enough features are identified to distinguish all known problems from each other and normal operation, the feature set is deemed satisfactory for diagnostic purposes.

If an attempt to classify incoming data is successful (i.e., the fault or irregularity is old and been recognized before), then the classification is provided to a response block 17 for identifying appropriate actions, if any, which have been previously identified for remedying the fault or irregularity.

If the attempt to classify incoming data is unsuccessful because there is no matching pattern in existing database 16, then the data is recognized as a new case and it is forwarded to an analysis process 18 which may include an expert team working with various test equipment, test vehicles, and software (e.g., simulation) tools. Once the analysis process resolves the data pattern into a newly classified fault or early warning condition, the classification data including any reference patterns or other recognition instructions are uploaded to diagnostic database 16. Remedial actions to be taken in response to the newly recognized case are communicated to response block 17 and to a service organization (e.g., dealerships) 20.

Based on the classification of data from vehicle 10, responsive actions are forwarded by response block 17 to telematics response center 12 (for forwarding to vehicle 10) and/or service organization 20. Responsive actions sent to vehicle 10 may include the communication of new control parameters to be downloaded into and used by its electronic controllers or a message to be displayed to the vehicle operator recommending a service visit for corrective actions (e.g., adjustment of components or replacement of parts). With regard to a recommended service visit, service organization 20 is also notified so that the visit can be arranged and replacement parts, if needed, can be obtained in advance. Telematics response center 12 can be used to schedule the service appointment. Thus, any fault or potential fault conditions of vehicle 10 are identified quickly and a restoration of nominal operation is performed proactively with minimal disruption to the operator of vehicle 10 and in the shortest possible time.

In addition to capturing diagnostic data, the present invention is capable of capturing data far in advance of any failure detection on-board the vehicle. Such data is captured from the vehicle, preserved, and analyzed for trend behavior to project the time-to-failure of systems under analysis. The information gathered for this purpose and its frequency of capture are dependent upon the behaviors of each specific vehicle system. The data capture and analysis is adjusted to provide the highest accuracy in time to failure prediction. For example, if no deterioration in a particular subsystem is noted, and the projected time to failure is extremely long, no further transmissions will be necessary unless the situation changes.

In this regard, the system is also designed to capture statistical summary information about the vehicles operation history. This information, usually in the form of multidimensional histograms (generalized histogram information is not limited to one, two, or merely three dimensions, but extensible beyond three to capture relevant correlations in operating parameters).

This statistical summary is used to assess severity of operation in various operating modes to better project system lifetimes.

To ensure maximum effectiveness of diagnosis and repair, a process monitor 21, such as a Six Sigma process, interfaces with the vehicle owner/operator and service organization 20. Performance metrics such as accuracy of diagnosis, frequency of classified faults across a fleet or vehicle line, repair time, and other variables are measured by process monitor 21 and data trends and potential improvements are identified and implemented.

Figure 2:
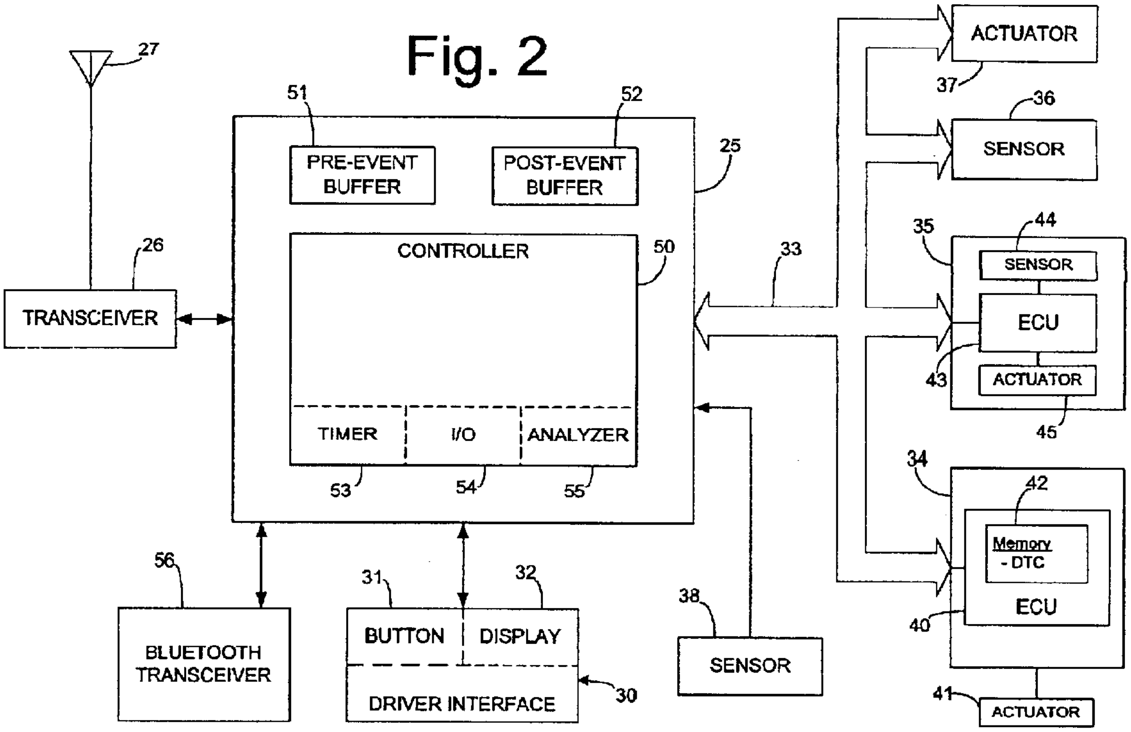
FIG. 2 is a block diagram showing in-vehicle data collection, data analysis, and communication apparatus.

Turning now to FIG. 2, the on-board apparatus includes a diagnostics module 25 which may or may not be packaged within a main telematics module. In either case, diagnostics module 25 is connected to a transceiver module 26 of the main telematics unit and communicates with the telematics response center via an RF antenna 27. A driver interface 30 connected to diagnostics module 25 includes input push buttons 31 and a display 32, for example.

For purposes of collecting diagnostic data, diagnostics module 25 is coupled to a vehicle communication bus 33, such as a standard controller area network (CAN) or a bus complying with the IEEE J1850 standard. Bus 33 is also connected to various electronic operational components throughout the vehicle, including electronic modules 34 and 35, a sensor 36, and an actuator 37. Modules 34 and 35 may include a powertrain control module, an anti-lock brake module, a body accessories module, a lighting control module, a climate control module, an audio/entertainment module, or a chassis control module, for example. Sensor 36 shares sensed data signals with the multiplex network over bus 33 and may include a temperature sensor or a pressure sensor, for example. Actuator 37 is remotely controlled over the multiplex network and may include a variable chassis damper, for example. Fundamentally, diagnostic module 25 has complete access to all signals transmitted on bus 33 and has the ability to exchange messages with each other node in the multiplex network. Thus, diagnostic module 25 can monitor and extract existing network traffic or can request specific data from specific components (nodes).

Diagnostic module 25 can also have other connections to other electronic components, such as a direct connection to a sensor 38. One such sensor is an acoustic or vibration sensor which records detailed acoustic bandwidth signals for detailed analysis of vibration and noise problems. Furthermore, where a vehicle utilizes a plurality of separate multiplex busses (e.g., one for most components and a separate bus for audio/entertainment components), diagnostic module 25 preferably has an interface to each bus.

Modules 34 and 35 include electronic control units (ECUs) 40 and 43, respectively, typically each including a programmable microcontroller. Module 34 is connected to an external actuator 41 while module 35 has an internal sensor 44 and an internal actuator 45. ECU 40 includes a memory 42 for storing among other things a diagnostic trouble code (DTC) whenever any self-diagnostic routines in ECU 40 detect a predetermined error condition. For example, the OBD-II on-board diagnostics standard defines various codes which must be made available over the multiplex network.

Diagnostics module 25 includes a controller 50, a pre-event buffer 51, and a post-event buffer 52. Controller 50 retrieves predetermined subsets of data as electrical signals from the various operational components (i.e., modules, sensors, and actuators) and periodically stores them within pre-event buffer 51. When a trigger event occurs, controller 50 retrieves and stores additional data in post-event buffer 52, formats a data message, and sends the message to the telematics response center via transceiver 26.

Controller 50 further includes a timer 53, an input/output (I/O) interface 54, and an analyzer 55. Trigger events can be generated within controller 50 in response to timer 53 or analyzer 55. I/O 54 provides interconnection for driver interface 30 and for an optional local wireless network transceiver 56, such as a Bluetooth transceiver. The local wireless network can be used to simplify connection with diagnostic module 25 while in a service bay, for example.

Figure 3:
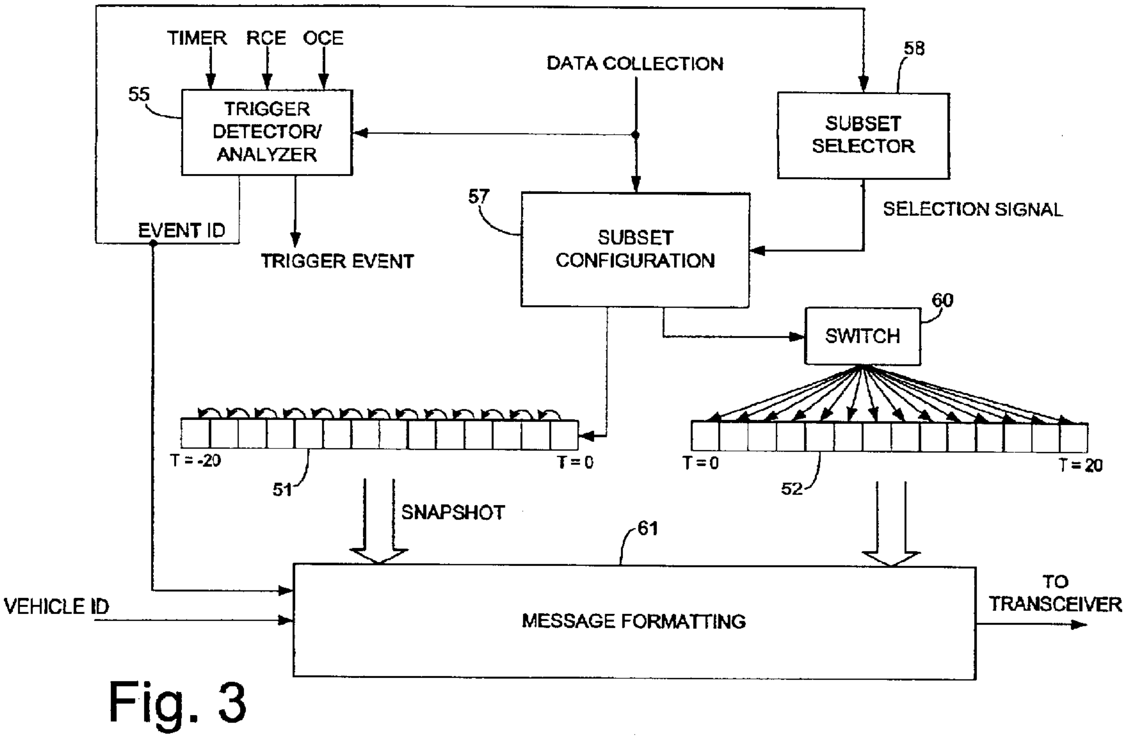
FIG. 3 shows portions of the apparatus of FIG. 2 in greater detail.

The operation of controller 50 is shown in greater detail in FIG. 3. A subset configuration 57 controls a selection of data within all the data signals available for collection and provides periodic samples to an input of pre-event buffer 51. As later samples arrive at buffer 51, the existing contents circulate down a slot with one oldest sample being discarded. At any particular sample time, a vector or collection of various data signals or parameters (e.g., including calculated parameters) are stored and treated as a unit.

Initially, subset configuration 57 is set by a subset selector 58 to a default subset. The default subset provides a broad overall picture of vehicle performance and is used during times that substantially nominal operation of all components is present. Upon occurrence of a trigger event, a subset tailored to provide data of greater relevance to conditions associated with the cause of the trigger event is selected by subset selector 58 in response to an event ID generated by analyzer 55.

Analyzer 55 detects trigger events in response to 1) a timer signal, 2) a remote command event (RCE) initiated by the computation center, 3) an operator command event (OCE) initiated by the driver pressing a button on the driver interface after noticing symptomatic vehicle behavior, and 4) analysis of data signals collected from the vehicle components or calculated parameters determined within analyzer 55 based on the collected data signals. Data analysis causing a trigger event may include the setting of a flag or a diagnostic trouble code within another module in response to analysis that actually occurs in that other module. In response to any of these conditions, analyzer 55 generates a trigger event signal to initiate trigger actions and generates the event ID signal to identify the causation of the current trigger event.

After a trigger event occurs and subset selector 58 has reconfigured subset configuration 57 according to the event ID, sample data within the new subset is directed through configuration 57 to post-event buffer 52 which has a predetermined length (e.g., 20 seconds of samples collected at a sampling rate of about one sample every 4 milliseconds). A switch 60 can be used to direct each sample to its corresponding location in buffer 52, for example. A total sample window of about 40 seconds (20 seconds in the pre-event buffer and 20 seconds in the post-event buffer) is chosen as being sufficient in most cases to allow classification of a fault or irregularity. A time T=0 is assigned to the time of the trigger event. Thus, the pre-event buffer includes data for times T=−20 seconds through T=0 and the post-event buffer includes data for times T=0 through T=20 seconds.

At T=0, the contents of pre-event buffer 51 are stored as a snapshot in a message formatting block 61. Once post-event buffer 52 is full, its contents are formatted into a message in formatting block 61 along with the pre-event snapshot, event ID, and a vehicle ID (e.g., a VIN number). The formatted message is sent to the transceiver for broadcasting to the telematics response center.

Figure 4:
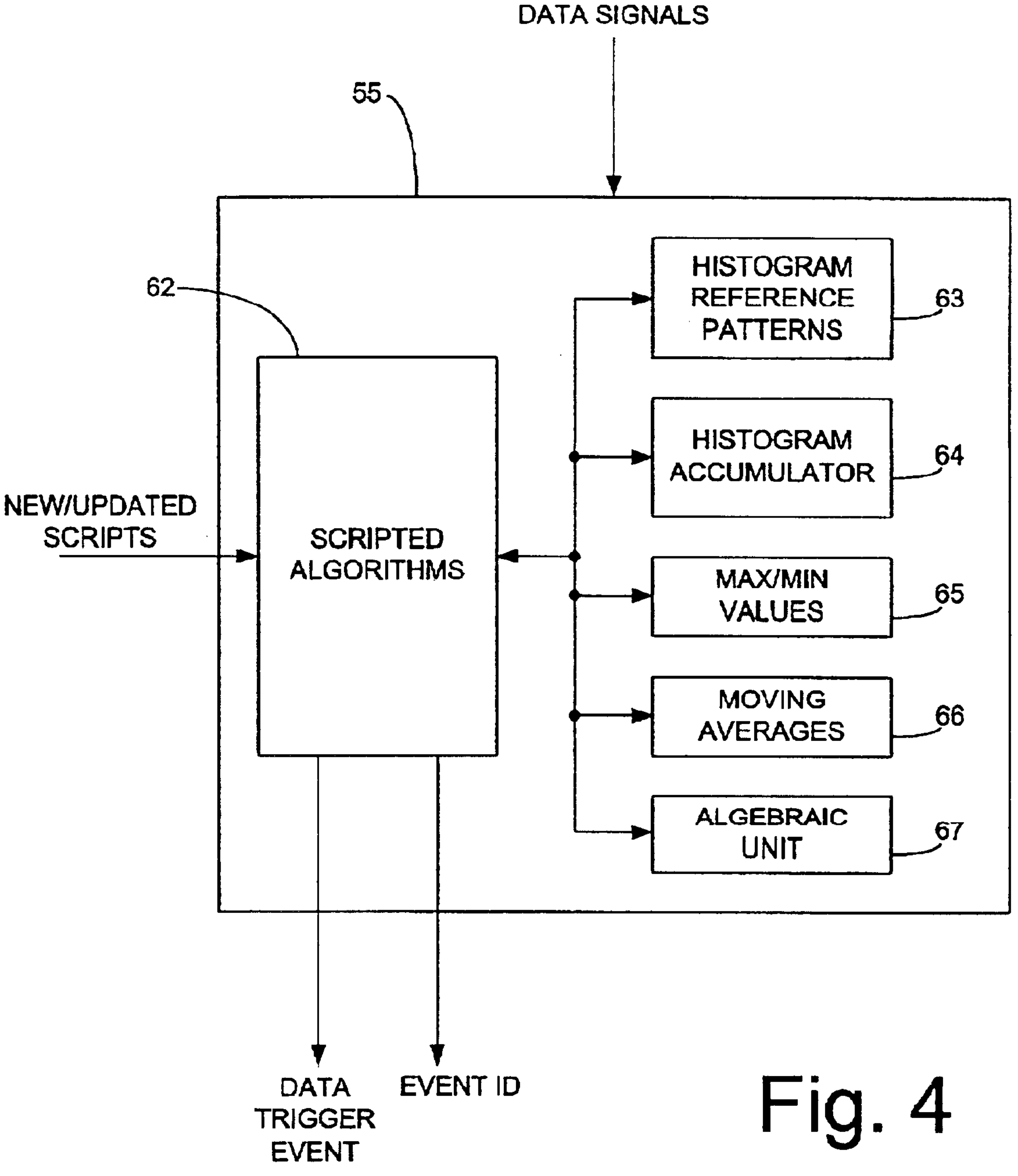
FIG. 4 is a block diagram showing the analyzer of FIGS. 2 and 3 in greater detail.

Further functional details of the data analysis performed in analyzer 55 to detect trigger events are shown in FIG. 4. Such analysis is performed according to scripted algorithms 62 which are executed by the microcontroller as a first indication or warning of potential faults or irregularities of the vehicle components (i.e., the components are in variance to their nominal operating states). This reduces the load on the computation center and on the communication link, since data is transmitted only during rare instances when operation is not nominal (or by specific request or periodic checks) rather than continuously as in prior art systems.

Scripted algorithms 62 perform data analysis using data signals collected by the diagnostic module which may or may not be included in the data subset then being stored in the pre-event or post-event buffers. To support the algorithms, the microcontroller of the diagnostic module preferably has functional capabilities including flow control constructs (IF-THEN-ELSE), loops (FOR loops and DO loops), Boolean operations (AND, OR, NOT), bit-shifting, and arithmetic operations (integer and floating point), for example. In addition, functions are included for causing specific messages to be sent and received from the vehicle bus, for generating event ID and trigger signals, and for initiating data recording to the post-event buffer.

Analyzer 55 includes histogram reference patterns 63 associated with particular algorithms that compile current data histograms in a histogram accumulator 64 and compare them with reference patterns 63 to detect a trigger event. An event ID may be assigned according to which reference pattern was matched, for example.

Analyzer 55 further includes resources (e.g., memory locations and/or hardware of firmware elements) including a max/min value block 65 for retaining a maximum and/or minimum value of a parameter or data signal. A moving average block 66 may be adapted to perform exponentially-weighted moving average (EWMA) calculations, for example. An algebraic unit 67 provides resources for standard algebraic function implementations.

Scripted algorithms 62 together with histogram reference patterns 63 can be updated using new or modified algorithms or patterns which can be downloaded from the telematics response center and which may typically originate at the computation center.

Figure 5:
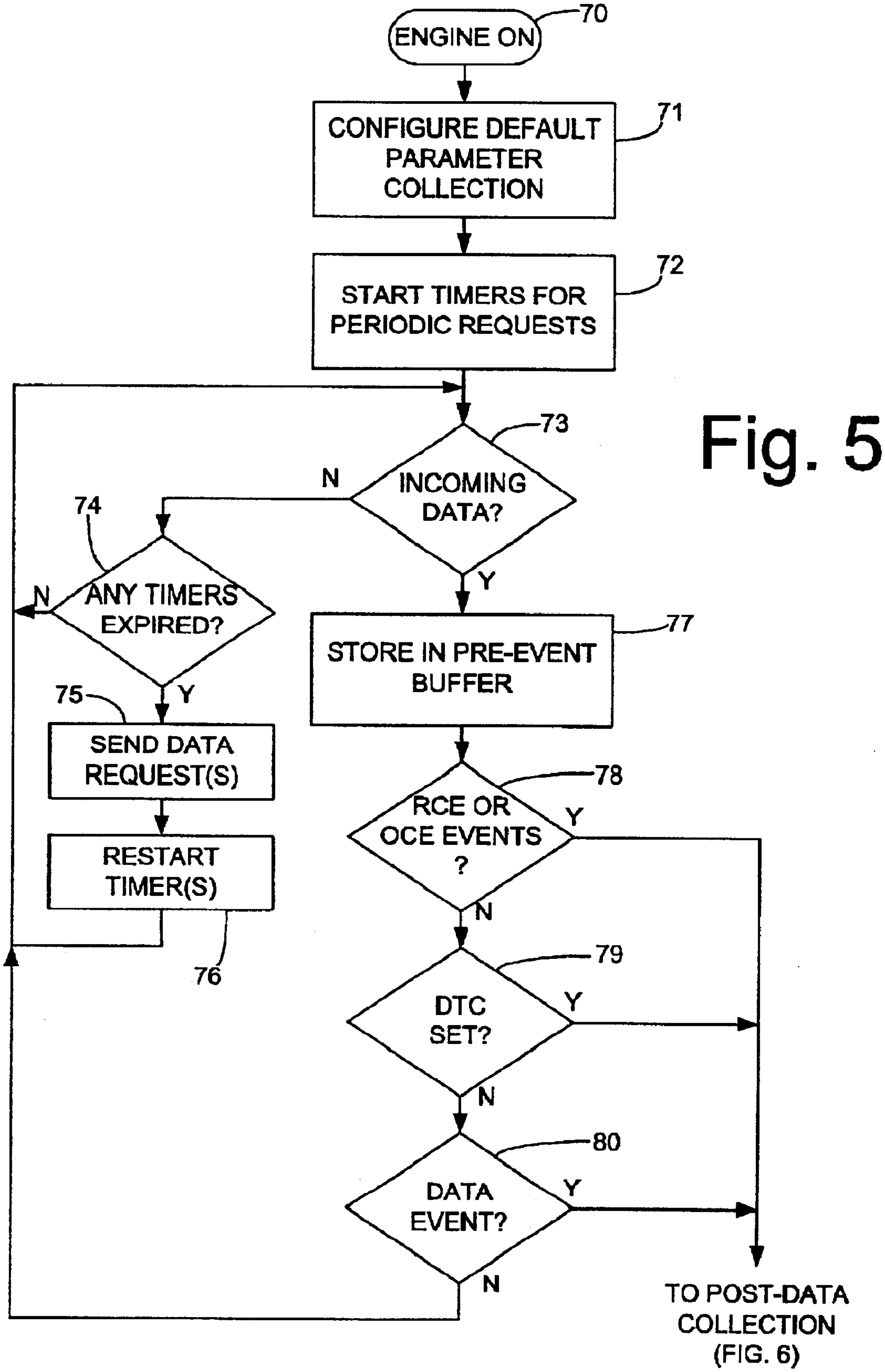
FIGS. 5 and 6 are flowcharts showing a preferred method of the present invention.
Figure 6:
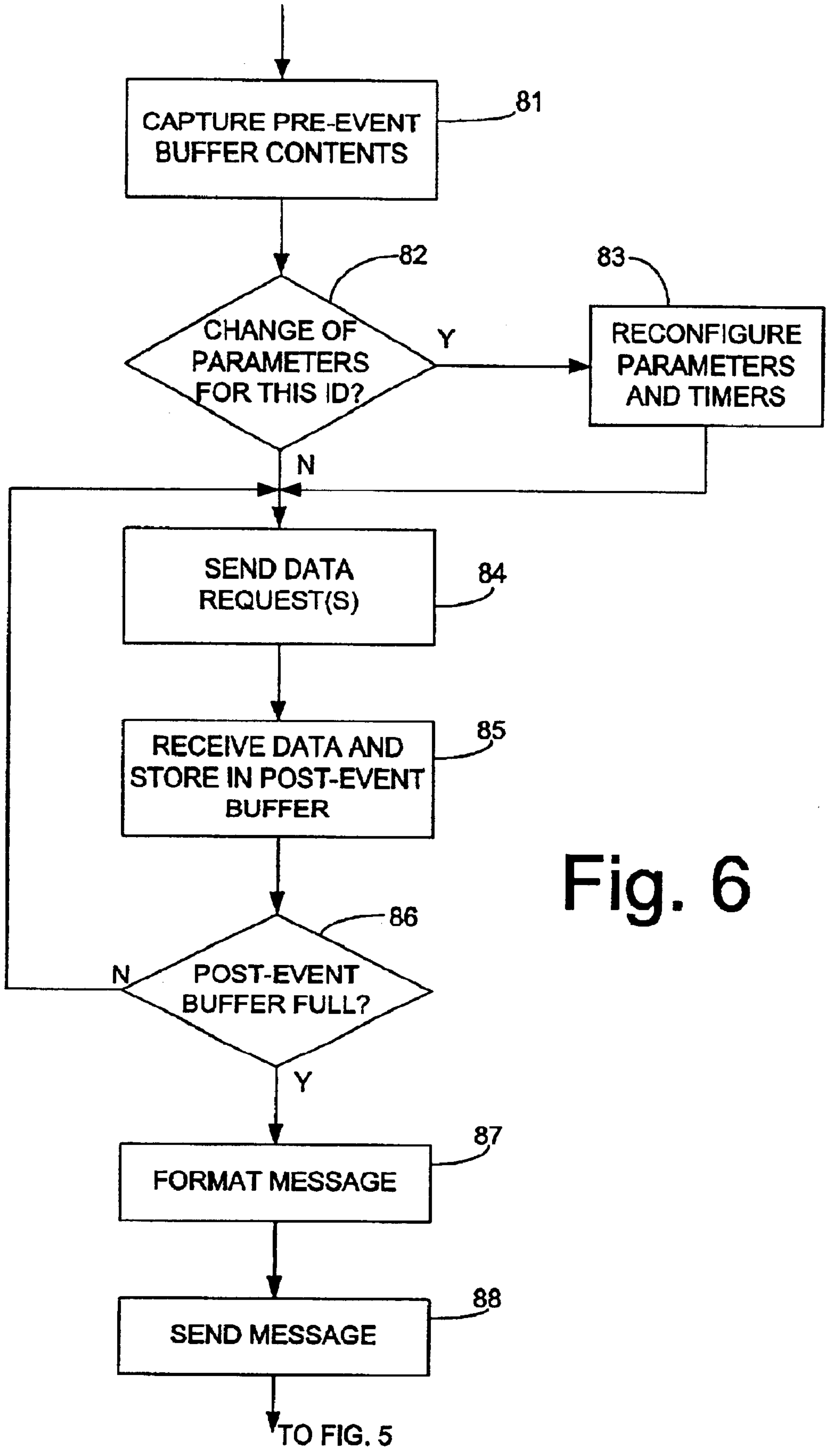

A preferred method of the present invention is shown in FIGS. 5 and 6. Diagnostic monitoring begins in step 70 as a “key-on” cycle initiates when the ignition key is turned on and the engine is started. The diagnostic module is configured in step 71 to perform a default parameter collection. In step 72, timers are started for setting a periodic sampling interval at which all the various samples or parameters are collected.

In step 73, a check is made to determine whether any data signals are being received from any operational components (e.g., from electronic modules over the multiplex bus). If not, then a check is made in step 74 to determine whether any timers have expired. If not, then a return is made to the check in step 73. If a timer has expired, then the diagnostic module sends a data request to a target module having the desired data in step 75. Alternatively, if the target data is available from a direct input into the diagnostic module then the target data is merely sampled at the appropriate input. Once a request is sent, then corresponding timers are restarted in step 76 and a return is made to step 73.

If step 73 determines that incoming data is present, then the data is stored as part of a predetermined time sample in the pre-event buffer in step 77. Checks are made in step 78 for RCE or OCE events, in step 79 for the setting of any DTC’s or flags, and in step 80 for a data event (i.e., an algorithm has found that specified conditions are satisfied such as tire pressure below a threshold value or a histogram of oil pressure matches a reference histogram). If all these checks are negative, then the method returns to step 73. If any one of these checks is positive, then the method goes on to post-event data collection in FIG. 6.

In step 81 of FIG. 6, the pre-event buffer contents are captured. This can be comprised of a cessation of updating of the buffer until the data message is sent or can be comprised of transferring the full buffer contents to yet another temporary memory block. In step 82, a check is made to determine whether the parameter subset corresponding to the event ID of the trigger event is different than the parameter subset currently configured. The subset is reconfigured in step 83 and timers are reconfigured, if necessary. For example, if default parameters were being stored in the pre-event buffer when a trigger event occurs with an event ID showing an engine problem, then the parameter subset may be changed to one including more engine-related parameters.

In step 84, data requests are sent to the vehicle operational components based on the parameter subset resulting from steps 82 and 83. Received data is stored in the post-event buffer in step 85. A check is made in step 86 to determine whether the last samples for the post-event buffer have been collected. If not, then a return is made to step 84.

Once the last samples have been stored in the post-event buffer, a message is formatted in step 87. The message preferably includes all the samples from the pre-event and post-event buffers, an event ID, and vehicle ID information such as VIN number. The formatted message is sent in step 88. After the message is sent, the method returns to data collection for the pre-event buffer. In one embodiment, a return is made to step 71 so that the default parameter subset is restored. Alternatively, a return may be made to step 73 in order to continue using the subset corresponding to the trigger event that just occurred. In that alternative embodiment, the default subset is preferably restored after some delay (e.g., as determined by the diagnostic module or in response to a command from the computation center).

Depending upon the severity of a trigger event, the sending of a particular message may be deferred. Cellular telephone airtime costs typically vary according to the time of day and day of the week. If a low severity trigger event occurs at a time with high associated airtime costs, then it may be preferable to delay message transmission until a time of lower airtime costs. For example, flags or DTC's leading to a trigger event may be of different types. A malfunction indicator light (MIL) is a light on the vehicle instrument panel that is required to be lit if the on-board OBD-II diagnostic strategy within a powertrain control module detects a hardware failure that could cause gaseous emission levels to be exceeded. A DTC in this category is referred to as a confirmed MIL DTC event. Some DTC detections do not result in turning on of the MIL until the DTC is present for a particular length of time or number of drive cycles. Until that requirement is reached, the DTC is considered a pending MIL DTC. Other DTC's are unrelated to MIL-type events (i.e., correspond to a non-emission critical component) and may have a greater or lesser severity depending upon the component and fault it represents.

For a confirmed MIL DTC, a message is preferably sent immediately. For a pending MIL DTC, the transmission of the message may preferably be deferred to a time of lower airtime cost. For other DTC's and for each data event (i.e., for each event ID), a predetermined designation can be provided to control whether message transmission is deferrable or not.

In order to defer message transmission, sufficient memory for storing multiple messages must be provided within the diagnostic module or telematics module. In a preferred embodiment, data samples are recorded at a sample rate of 250 per second (i.e., 4 milliseconds between samples) for a total time of 40 seconds. Each sample preferably contains about 5 bytes of data, a 2 byte time stamp identifying its position in the buffer, and a 1 byte packet ID. Each message may also include information identifying which data subset is contained in the message and/or specific identification of each individual parameter in the message data. Thus, total memory requirements for one message may be about 85 kilobytes.

The system of the present invention realizes significant advantages for users of the monitored apparatus (e.g., driver of a vehicle) not only in timely and accurate detection and correction of actual diagnosed malfunction but also in the ability to predict a likely failure and the likely time until failure occurs (i.e., prognostics). Such prognostics typically require extensive and interactive algorithms which are not practical to implement fully on-board the vehicle or other monitored apparatus. The present invention segments the computational/classification tasks for maximum efficiency, lowest overall cost, and fastest results. Thus, the invention 1) reduces unplanned downtime and vehicle breakdowns, 2) helps optimize maintenance intervals to reduce lifetime vehicle servicing costs, 3) enables no-hassle maintenance with convenient service scheduling and the ability to service some faults or irregularities by remote downloading of control parameters or algorithms, for example, and 4) quick detection of fleet-wide malfunctioning of particular components so that a potential defect can be corrected for all vehicles in service and corrective action taken to eliminate the defect from vehicles still being produced.

Some examples of prognosticated failures and the corresponding monitored parameters for automotive vehicles follow.

With regard to the tire system, tire pressure, tire balance, and tire wear may be monitored. Patterns of changes in these parameters can predict failure due to damaged or leaking tires and tire mismatches. These parameters can also exhibit the eventuality of shock absorber failure.

In the brake system, pad wear and other brake performance parameters are monitored. It is possible to predict brake impairment from pad wear, warped rotors or disks, and automatic adjuster failure.

With regard to the transmission system, parameters of transmission shift quality, fluid quality, fluid temperature, fluid level, and transmission controller diagnostic codes are collected. Failures from gear and bearing wear, out of adjustment bands, loss of fluid, or problems in the electronic module can be detected.

Within the engine system, collected parameters can include oil quality, oil level, oil pressure, oil temperature, roughness, cooling system parameters, engine misfire, catalyst performance, and others. Numerous potential failures can be predicted including clogged fuel injectors, bad spark plugs, engine calibration, clogged air, fuel, or oil filters, engine valve malfunction, and others.

What is claimed is:

1. A system for monitoring performance of an apparatus, comprising:

a plurality of operational components functioning in said apparatus, each operational component with a predetermined nominal operating state and each generating respective electrical signals pursuant to their operation;

a data collection memory in said apparatus storing samples of said electrical signals in a rolling buffer;

an analyzer in said apparatus responsive to said electrical signals for performing data analysis and calculating predetermined parameters to detect a trigger event indicative of at least a potential variance of an operational component from its nominal operating state;

a computation center located remotely from said apparatus and having a database storing representations of electrical signals for classifying nominal and irregular operating states of said operational components; and a transmitter activated by said trigger event to automatically transmit at least some of said stored samples in said rolling buffer at the time of said trigger event to said computation center;

wherein said computation center receives said transmitted samples and classifies them according to said nominal or irregular operating states.

2. The system of claim 1 wherein said transmitter transmits stored samples collected over a predetermined time interval spanning said trigger event.

3. The system of claim 2 wherein said samples transmitted by said transmitter are comprised of a predetermined subset of said electrical signals.

4. The system of claim 3 wherein said transmitted samples collected prior to said trigger event correspond to a first predetermined subset of said electrical signals and said transmitted samples collected after said trigger event correspond to a second predetermined subset of said electrical signals.

5. The system of claim 4 wherein said second predetermined subset of said electrical signals is determined in response to a source of said trigger event.

6. The system of claim 1 wherein said samples transmitted by said transmitter are comprised of a predetermined subset of said electrical signals.

7. The system of claim 6 wherein said predetermined subset is chosen from a plurality of subsets in response to said electrical signals.

8. The system of claim 6 wherein said predetermined subset is chosen from a plurality of subsets in response to a control signal received from said computation center.

9. The system of claim 1 wherein said analyzer compares stored samples in said rolling buffer to a predetermined pattern, and wherein said trigger event is generated in response to said comparison.

10. The system of claim 9 wherein said predetermined pattern is comprised of a histogram.

11. The system of claim 1 wherein said analyzer performs a predetermined analysis routine to detect said trigger event.

12. The system of claim 11 wherein said transmitter is comprised of a transceiver and wherein said predetermined analysis routine is downloaded from said computation center via said transceiver.

13. The system of claim 1 wherein said apparatus is comprised of a motor vehicle and said transmitter is a wireless transmitter.

14. The system of claim 1 wherein said samples summarize an operational history of said apparatus and said computation center analyzes a severity of operation for various system components in order to project operational lifetime in response to said samples.

15. The system of claim 1 wherein said operational components include electronic modules having respective microcontrollers, and wherein said samples include input and output signals of said microcontrollers.

16. The system of claim 1 wherein said operational components include electronic modules having respective microcontrollers, and wherein said samples include memory contents within said microcontrollers.

17. The system of claim 1 wherein said operational components include sensors and actuators, and wherein said samples include electrical signals from and to said sensors and actuators.

18. The system of claim 1 wherein said operational components include electronic modules having respective microcontrollers, and wherein said trigger event is comprised of the detection of the setting of a predetermined flag in one of said microcontrollers.

19. The system of claim 1 wherein said operational components include electronic modules having respective microcontrollers, and wherein said trigger event is comprised of the detection of the setting of a predetermined diagnostic code in one of said microcontrollers.

20. The system of claim 1 wherein said analyzer compares at least one sample with a predetermined threshold, and wherein said trigger event is generated in response to said comparison.

21. The system of claim 1 wherein said analyzer determines an average value of a predetermined electrical signal over time, compares said average value to a predetermined average threshold, and generates said trigger event in response to said comparison.

22. The system of claim 1 wherein said trigger event is detected in response to an elapsed period of time.

23. The system of claim 13 further comprising an operator interface for displaying messages from said computation center in response to a classification of transmitted samples.

24. The system of claim 1 wherein said computation center adjusts said database in response to said transmitted samples so that said adjusted database is used for future classifications of other apparatus by said computation center.

* * * * *